United States Patent [19]

Kohashi

[11] 4,413,739

[45] Nov. 8, 1983

[54] AUTOMATIC WEIGHT SORTER

[75] Inventor: Toru Kohashi, Hyogo, Japan

[73] Assignee: Yamato Scale Company, Limited, Hyogo, Japan

[21] Appl. No.: 350,606

[22] Filed: Feb. 22, 1982

[51] Int. Cl.³ .................. B07C 5/28; G01G 11/06
[52] U.S. Cl. ................... 209/593; 209/592; 177/25; 177/50; 364/567
[58] Field of Search ............... 209/592–595; 198/504, 505; 177/25, 50, 145, 187, 200, DIG. 8; 73/1 B; 364/567, 568, 478, 555, 571, 581, 582

[56] References Cited

U.S. PATENT DOCUMENTS

| | | | |
|---|---|---|---|
| 3,857,488 | 12/1974 | Le Cren | 209/593 |
| 3,899,915 | 8/1975 | Williams, Jr. et al. | 177/50 |
| 3,976,150 | 8/1976 | Wilson et al. | 364/567 |
| 4,096,950 | 6/1978 | Brook | 209/593 |

FOREIGN PATENT DOCUMENTS 46-608507 6/1971 Japan.
46-608508 6/1971 Japan.

*Primary Examiner*—Robert B. Reeves
*Assistant Examiner*—Donald Hajec
*Attorney, Agent, or Firm*—Eugene E. Geoffrey, Jr.

[57] ABSTRACT

An automatic weight sorter for weighing a series of articles successively fed by a belt conveyer and then sorting them into predetermined classes based upon their measured weights, which includes an improved automatic weight correcting device for cancelling the difference between static and dynamic measurements, the mode of correction being easily preset by simply applying actual articles to the sorter for measurement while it is turned into a set-up mode of operation before normal operation is started.

1 Claim, 6 Drawing Figures

AUTOMATIC WEIGHT SORTER

This invention relates to an automatic weight sorter, especially to a device for correcting its measured weights.

There are many kinds of devices known in this field, which are used for weighing a series of the same kind of articles successively fed thereto and sorting them into predetermined classes of weight. Some examples of such prior art are disclosed in Japanese Pat. Nos. 608507 and 608508 (Publication Nos. 45-36553 and 45-36554) cited herein as references. In such devices, articles are fed successively by a weighing conveyer and weighed dynamically, that is, during movement in the midway. The weight value measured in this manner often differs from the true weight measured statically due to external causes such as shock and vibration. While the measured value is sent to a judging circuit in the succeeding stage in a form of electric signal, it has been corrected manually in the prior art by adjusting a control element such as a variable resistor inserted in the signal path. This system is generally satisfactory when the variance of the weight of articles is small so that the relationship between the statically measured value (hereinunder referred to as "static weight") and the dynamically measured value (hereinunder referred to as "dynamic weight") is kept constant, whereby every article and the same kind of articles can be handled for a long time. However, it suffers substantial trouble in such a case where the abovementioned relationship varies with every article or where the kind of articles is changed frequently and the mode of correction must be changed correspondingly every time.

Accordingly, an object of this invention is to provide an automatic weight sorter with an automatic weight correcting device and to provide this device with a control system in which the most of correction can be simply set using actual articles.

In accordance with this invention, an automatic weight sorter is provided comprising a weighing conveyer for feeding articles to be weighed, sequentially, weighing means located in the midway of the conveyer for weighing the articles sequentially to produce weight signals indicative of their measured weights, correction means for applying a predetermined correction to the weight signals, judging means for judging which one of the predetermined plural ranges of weight is to be assigned to each corrected weight signal, and distributing means for sending each article to a division corresponding to the assigned weight range.

According to a feature of this invention, the correction means comprises a first change-over switch for producing either first or second command signals at a time to specify static or dynamic measurement, respectively, a second change-over switch for producing either third or fourth command signals at a time to specify normal or correction operation, respectively, a first memory for storing a current weight signal input in response to the first and fourth command signals, a second memory for storing a current weight signal input in response to the second and fourth command signals, and an arithmetic circuit for applying correction to the weight signals in accordance with a prescribed equation from the contents of both memories.

According to another feature of this invention, there are provided means for driving the weighing conveyer, which is arranged to stop in response to the first command signal and start in response to the second command signal.

Now, the invention will be described hereinunder in more detail with reference to the accompanying drawings.

In the drawings.

Throughout the drawings, like reference numerals are used to denote corresponding components.

Figure 1:
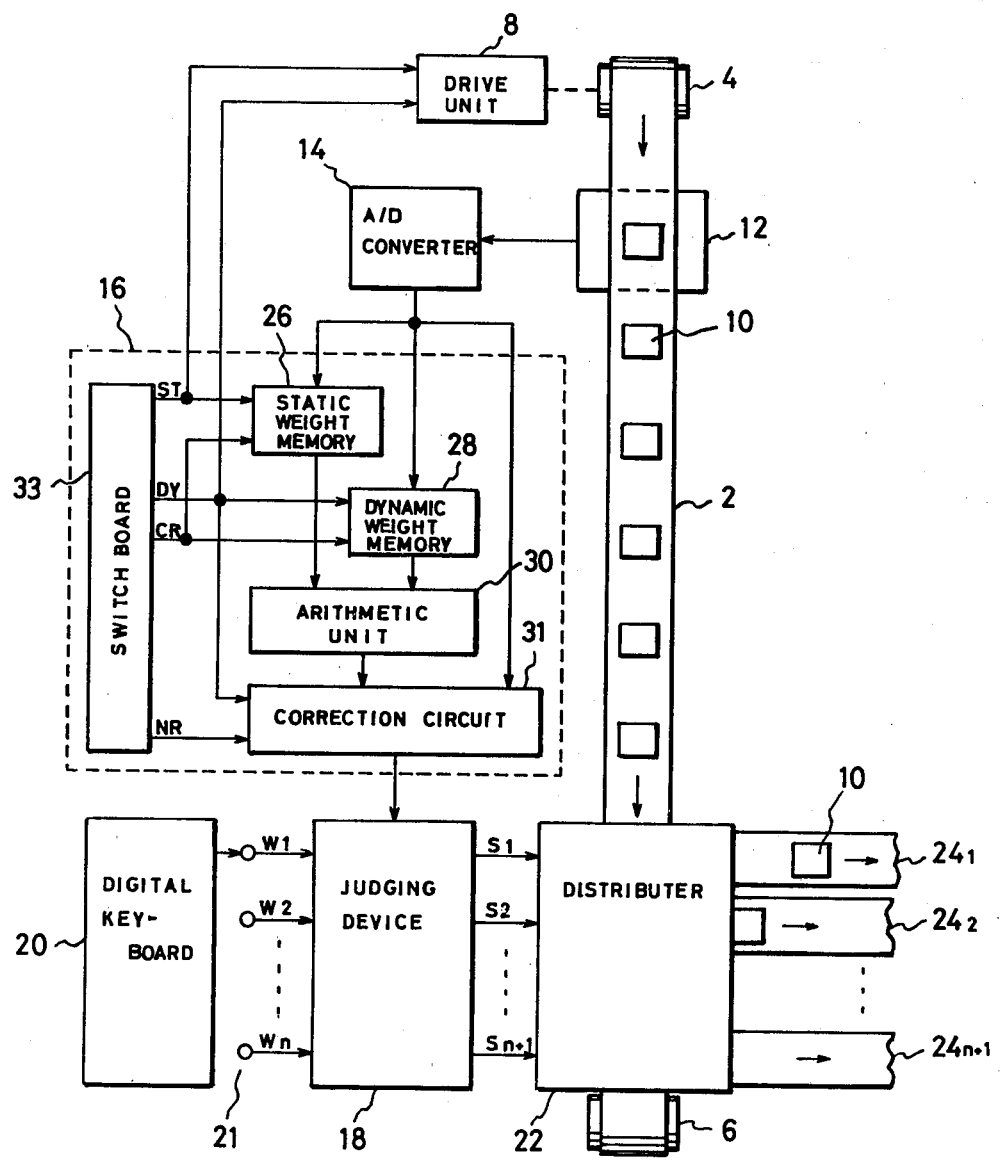
FIG. 1 is a block diagram representing an arrangement of an automatic weight sorter embodying this invention.

In the automatic weight sorter shown in FIG. 1, a belt conveyer 2 is driven between a pair of rollers 4 and 6 by a driving device 8 to transport articles 10 to be sorted successively in the direction of the arrow. Though not shown in the drawing, loading of the articles 10 onto the conveyer 2 may be effected by any known manual or automatic system. A weighing device 12 is located under and in the midway of the conveyer 2, which includes a known spring balance, load cell or the like to sense weights of the articles 10 transported thereto and produce analog dynamic weight signals indicative of the weights sensed. The analog signals are converted by an analog-digital (A/D) converter 14 into digital weight signals which are supplied to a correction device 16. The correction device 16 applies predetermined correction to the dynamic weight signal inputs to produce corresponding static weights as described later and supplies static weight signals indicative of the static weights to a judging device 18.

The judging device 18 is of a known type and stores in its built-in memories (not shown) predetermined weight values $W_1, W_2, \ldots W_n$ supplied, for example, from a conventional keyboard input device 20 through switch terminals 21. The judging circuit 18 also includes comparators (not shown) which compare the static weight signal inputs with the contents of the respective memories and supply a distributor 22 with, for example, a sorting signal $S_1$ when the weight signal is greater than $W_1$, a sorting signal $S_2$ when the weight signal is within a range to $W_1$ above $W_2, \ldots$ and a sorting signal $S_{n+1}$ when the weight signal is less than $W_n$, respectively. The distributor 22 is also of a known type, which includes chutes $24_1, 24_2, \ldots 24_{n+1}$ corresponding to the respective sorting signals and, for example, electromagnetic mechanical means for supplying the articles 10 corresponding to the weight signals to the corresponding chutes, respectively, in response to the sorting signals. The structures of the respective sections of the above-described automatic weight sorter will not be described further, except for the correction device, since they have been proposed already in various types and, moreover, have no direct connection to this invention.

According to this invention, the correction device 16 includes a pair of memories 26 and 28 which receive the digital weight signals from the A/D converter 14, an arithmetic unit 30 for applying predetermined arithmetic operation to the contents of the memories 26 and 28, and a correction circuit 31 for adding the result of the operation to the digital weight signals to effect predetermined correction and producing correction outputs, that is, calculated static weight signals. The correction circuit 31 includes a switch board 33 having a pair of change-over switches (not shown), one switch being arranged to produce selectively either a static measurement command signal ST or a dynamic measurement command signal DY and the other switch being arranged to produce selectively either a normal operation command signal NR or a correcting operation command signal CR. The pair of command signals from each switch may be high and low level signals, or binary "1" and "0" signals, respectively. The static and dynamic measurement command signals ST and DY are supplied to the conveyer driving device 8 which is arranged to stop the conveyer 2 in response to the signal ST and start it in response to the signal DY. The memory 26 receives the static measurement and correcting operation command signals ST and CR and the memory 28 receives the dynamic measurement and correction operating operation command signals DY and CR, from the switch board 33. These memories 26 and 28 are arranged to store the current output of the A/D converter 14 in response to the presence of both pairs of input command signals, respectively. The correction circuit 31 receives the dynamic measurement and normal operation command signals DY and NR from the switch board 33 and produces a corrected weight output in response to the presence of both of these signals.

Before starting normal operation, the switches on the switch board 33 are turned to produce the static measurement and correcting operation command signals ST and CR. The signal ST acts on the driving device 8 to stop the conveyer 2. On the other hand, the signals ST and CR enable the memory 26 and the memory 28 to store the static weight signal of an article having a reference weight if the article is put on the conveyer 2 just over the weighing device 12 at that time. If one of the switches is then turned to produce the signal DY in place of the signal ST, the driving device 8 will start the conveyer 2 in response to the signal DY. In addition, the memory 28 is enabled by the signals DY and CR. If the same article is put on the conveyer 2 just before the weighing device 12 at that time, a dynamic weight signal is produced when the article passes the weighing device 12, and it is stored in the memory 28. Thus, the memories 26 and 28 are rendered to store static and dynamic weights, respectively. Therefore, they are indicated as static weight memory and dynamic weight memory, respectively, in FIG. 1, though they may be quite the same in structure. While both memories conserve their contents thereafter as long as the kind of article is constant and the static and dynamic weights are unchanged, they may be cleared by suitable means (not shown) when a change of the contents is requested.

In the correction system according to this invention, the corrected weight (static weight calculated) is obtained on the basis of the mathematical relationship between the static and dynamic weights stored in the memories 26 and 28. The mathematical relationship is assumed to be predictable empirically or experimentally for each kind of the subject articles and the program for numerical calculation according to this relationship is preset in the arithmetic unit 30 and correction circuit 31. Upon completion of the abovementioned preparation, the other switch is turned to produce the signal NR in place of the signal CR. Then, the correction circuit 31 is enabled by the signals DY and NR to apply predetermined correction to the dynamic weight signals supplied from the A/D converter 14 in cooperation with the arithmetic unit 30. While, in the drawing, the calculation circuit is divided into two blocks 30 and 31, the former arithmetic unit 30 is arranged to calculate previously and store the constant portion which has no connection to the successive outputs of the A/D converter 14 and the latter correction circuit 31 is arranged to calculate every time the portion which depends upon these outputs. The blocks 30 and 31 may be constructed as a single unit or may be composed of a commercial mircocomputer programmed in accordance with a predetermined schedule of calculation.

Figure 2:
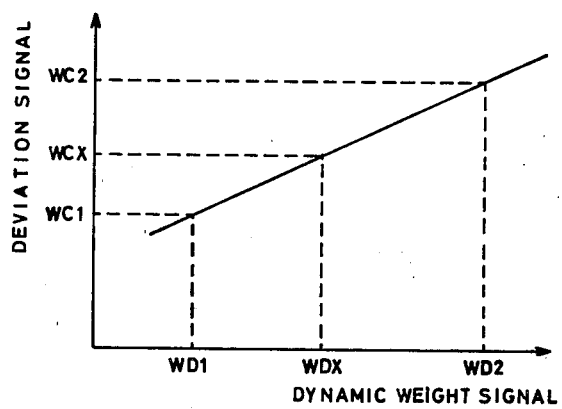
FIG. 2 is a graph representing a relationship between dynamic and static weights of an example of an article.

The above mathematical relationship varies with changes of shape, size and value and range of weights of the articles. However, it has been found that, in many cases, the difference between the static and dynamic weights, that is, deviation is proportional to the value of dynamic weight, as shown in FIG. 2. In the drawing, the abscissa indicates the dynamic weight WD and the ordinate indicates the deviation WC (=WD-WS, where WS is the static weight). In this case, in order to obtain deviation WCX corresponding to any dynamic weight WDX, it is necessary to obtain the slope of the straight line as shown. This slope or inclination can be calculated using the following equation by previously storing two pairs of static and dynamic weights WS1, WD1 and WS2, WD2.

$$WCX = WC1 + \frac{WC2 - WC1}{WD2 - WD1}(WDX - WD1) \qquad (1)$$

Figure 3A:
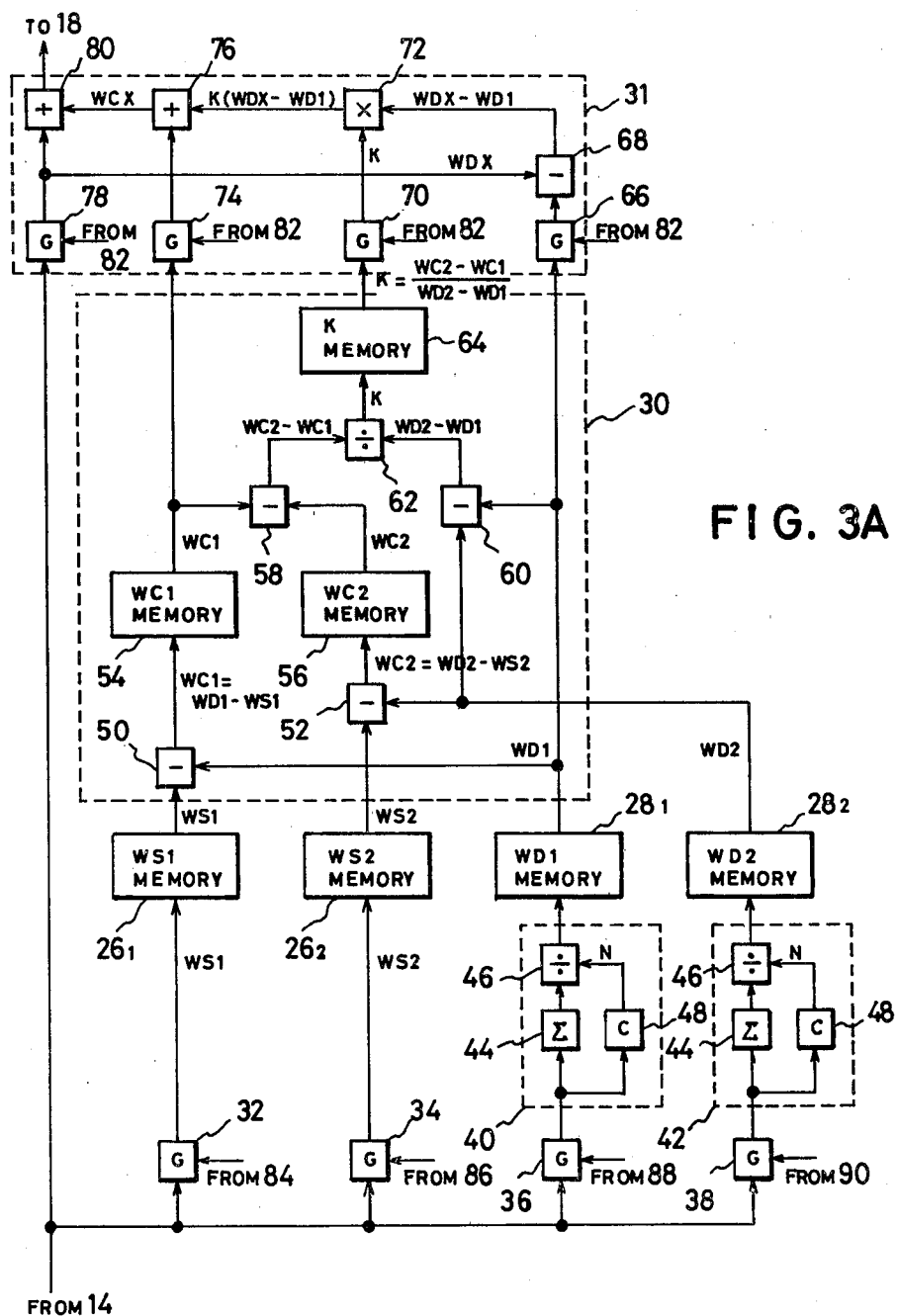
FIG. 3A is a block circuit diagram representing an embodiment of a correction circuit according to this invention.

FIG. 3A shows an example of a circuit for adding the deviation obtained from this calculation to the dynamic weight to produce a static weight WSX.

In this circuit, four memories $26_1$, $26_2$, $28_1$ and $28_2$ are provided for storing reference static weights WS1 and WS2 and reference dynamic weights WD1 and WD2, respectively. The output of the A/D converter 14 (FIG. 1) is supplied through gates 32 and 34 to the memories $26_1$ and $26_2$ and also through gates 36 and 38 and average circuits 40 and 42 to the memories $28_1$ and $28_2$, to be stored therein, respectively. The average circuits 40 and 42 are the same in structure and each includes an accumulator 44, a counter 48 and a divider 46. The accumulator 44 accumulates the input weights and the counter 48 counts the number of these inputs and, when the number reaches a predetermined value N, produces a count output N and then it is cleared together with the accumulator 48. The divider 46 divides the accumulated input by the count output N from the counter 48 to produce an average output. As the value of the dynamic weight varies in general every measurement, even if the same article is weighed, the average value obtained from several times of measurement is to be used as the reference value in order to maintain high accuracy.

Figure 3B:
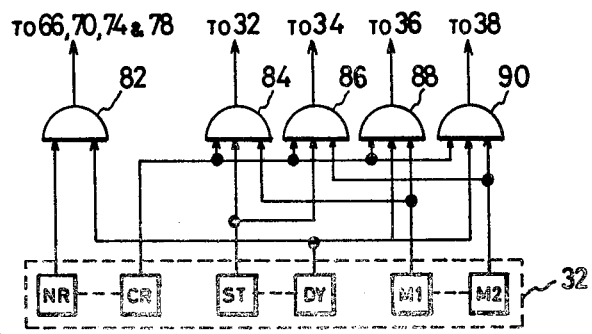
FIG. 3B is a diagram representing a control switch circuit of the correction circuit of FIG. 3A.

The gates 32, 34, 36 and 38 are normally-closed gates (or normally-open switches) controlled by a switching circuit as shown in FIG. 3B. This circuit is provided with a switch board 33 (FIG. 1) having push-button switches NR, CR, ST and DY for specifying NORMAL OPERATION, CORRECTING OPERATION, STATIC MEASUREMENT and DYNAMIC MEASUREMENT, respectively, and a pair of push-button switches M1 and M2 for specifying a pair of articles having far different weights, respectively. The three pairs of switches NR and CR, ST and DY, and M1 and M2 coupled respectively by dashed lines are interlocked to produce mutually complementary binary signals. For example, if the switches NR, ST and M1 produce outputs "1", the outputs of the switches CY, DY and M2 are necessarily "0", and vice versa. This switching circuit also includes five AND circuits 82, 84, 86, 88 and 90. The output of the switch NR is connected to a first input of the AND circuit 82 and the output of the switch CR is connected to the first inputs of the AND circuits 84, 86, 88 and 90. The output of the switch ST is connected to the second inputs of the AND circuits 84 and 86 and the output of the switch DY is connected to the other input of the AND circuit 82 and second inputs of the AND circuits 88 and 90. The output of the switch M1 is connected to the third inputs of the AND circuits 84 and 88 and the output of the switch M2 is connected to the third inputs of the AND circuits 86 and 90. The output of the AND circuit 82 is applied to control inputs of normally-closed gates 66, 70, 74 and 78 and the outputs of the AND circuits 84, 86, 88 and 90 are applied respectively to control inputs of the gates 32, 34, 36 and 38. The respective gates are designed to conduct when their control inputs are "1", respectively. Though not shown in FIG. 3B, the outputs of the switches ST and DY are coupled to the conveyer driving device 8 as shown in FIG. 1, and the driving device 8 is designed to start the conveyer in response to the input "1" and stop it in response to the input "0".

Pushing now the switches CR, ST and M1, only the AND circuit produces output "1" which opens the gate 32, and the conveyer 2 stops. Putting a first article on the conveyer 2 just over the weighing device 12 under this condition, the weighing device 12 produces a static weight signal of this article which is supplied through the A/D converter 14 to the correction device 16 and then passes the open gate 32 to be stored in the memory $26_1$ as the static weight WS1. Next, removing the article from the conveyer and pushing the switch M2, the output of the switch M1 becomes "0" and the switch M2 produces output "1". Accordingly, the AND circuit 86, instead of the AND circuit 84, produces an output which opens the gate 34, and the gate 32 is closed. Putting then a second article which is heavier than the first article similarly over the weighing device 12 under this condition, the static weight WS2 is stored in the memory $26_2$ in the same manner. Next, removing the article and pushing the switches DY and M1, only the AND gate 88 produces an output to open the gate 36 and, at the same time, the conveyer 2 is started. Under this condition, putting the first article on the conveyer and letting it pass over the weighing device 12, the weighing device 12 produces a dynamic weight signal. Repeating the same procedure N times with the same article, N-number of dynamic weights are supplied to the average circuit 40 and the circuit 40 calculates their average value as aforementioned which is in turn stored in the memory $28_1$ as the dynamic weight WD1 of the first article. Similarly, when the switch M2 is pushed and the same procedure is repeated with the second article, its dynamic weight WD2 is stored in the memory $28_2$.

The contents WS1 and WD1 of the memories $26_1$ and $28_1$ are applied to a subtracter 50 which executes subtraction of WC1=WD1−WS1, and the result WC1 is stored in a memory 54. On the other hand, the contents of the memories $26_2$ and $28_2$ are supplied to a subtracter 52 which executes subtraction of WC2=WD2−WS2, and the result WC2 is stored in a memory 56. The contents of the memories 54 and 56 are applied in turn to a subtracter 58 which executes subtraction of WC2−WC1 and the result is applied to one input of a divider 62. The contents of the memories $28_1$ and $28_2$ are applied to a subtracter 60 which executes subtraction of WD2−WD1 and the result is applied to the other input of the divider 62. The divider 62 calculates a ratio K of WC2−WC1 and WD2−WD1, which is stored in a memory 64. The abovementioned elements 50 to 64 may be included in the arithmetic unit 30 of FIG. 1. The block corresponding to the correction circuit 31 of FIG. 1 includes four normally-closed gates (or normally-open switches) 66, 70, 74 and 78, which are opened by the output of the AND circuit 82 when the switches NR and DY of FIG. 3B are pushed to specify normally weighing and sorting operation. Under this condition, the dynamic weight output WDX of the A/D converter 14 is applied through a gate 78 to one inputs of a subtracter 68 and an adder 80 but cannot pass the gates 32, 34, 36 and 38 which are closed due to the output of the switch CR turned to "0". The subtracter 68 receives the content of the memory $28_1$ at the other input and executes subtraction of WDX−WD1, the result of which is applied to one input of a multiplier 72. The multiplier 72 receives the content K of the memory 64 at the other input and executes multiplication of K (WDX−WD1), the result of which is applied to one input of an adder 76. The adder 76 receives the content WC1 of the memory 54 at the other input and executes addition of WCX=WC1+K (WDX−WD1). This result WCX is the deviation as shown by the aforementioned equation (1), which is added to the dynamic weight WDX by the adder 80 to produce a corrected static weight output which is in turn applied to the judging device 18 (FIG. 1).

As described above, according to this invention, preparation setup of the corrected weighing operation of articles can be effected, without the special need for skillful operators, only through operation of the switches and accompanying loading of specific articles of the same kind onto the conveyer.

The above embodiment has been described about the case in which the equation (1) and the relationship of FIG. 2 are established between the dynamic and static weights. When the variance in weights of articles is substantially small, there are some cases in which the difference between the static and dynamic weights can be deemed constant regardless of the weights of the articles. Moreover, in some kind of articles, the ratio of the static and dynamic weights may be deemed constant. It is easy for those skilled in the art to design the arithmetic unit 30 and correction circuit 31 suitably in these cases.

Figure 4:
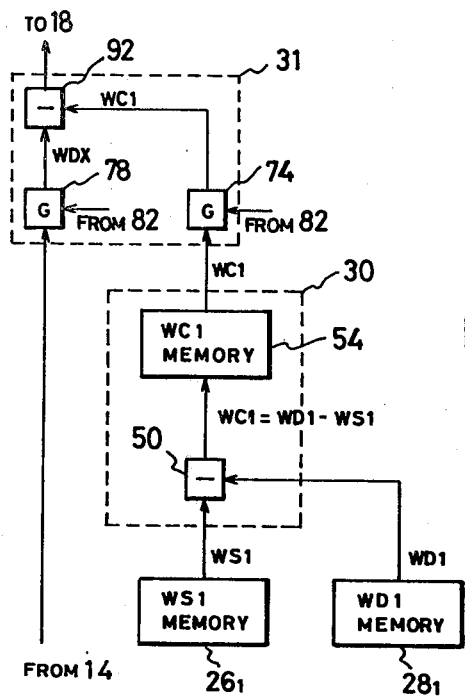
FIGS. 4 and 5 are block circuit diagrams representing other embodiments of the correction circuit of this invention.

FIG. 4 shows an example of the arithmetic unit 30 and correction circuit 31 used when the difference between the static and dynamic weights is always constant. In this case, only the memories $26_1$ and $28_1$ are used. The arithmetic unit 30 includes a subtracter 50 for calculating the difference of the contents of both memories (WC1=WD1−WS1) and a memory 54 for storing the result WC1 of the calculation, and the correction circuit 31 includes a subtracter 92 for subtracting the content WC1 of the memory 54 from the dynamic weight signal WDX.

Figure 5:
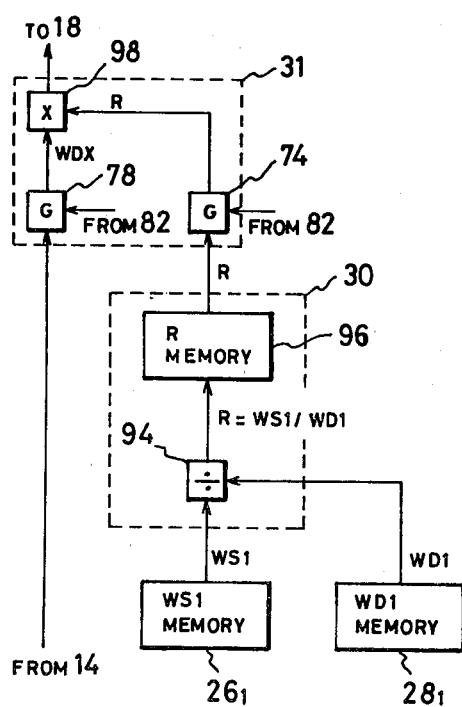

FIG. 5 shows another example of the arithmetic unit 30 and correction circuit 31 used when the ratio of the static and dynamic weights is always constant. In this case, the arithmetic unit 30 includes a divider 94 for dividing the content of the memory $26_1$ by the content of the memory $28_1$ and a memory 96 for storing the result of division R=WS1/WD1, and the correction circuit 31 includes a multiplier 98 for multiplying the dynamic weight signal WDX with the content of the memory 96.

While the arithmetic unit 30 and the correction circuit 31 may be substituted with those constituted as a unit having a predetermined circuit arrangement as occasion demands as above, it is also possible to utilize a microcomputer arranged to execute the same effect by suitably modifying its operation program.

What is claimed is:

1. An automatic weight sorter, comprising a weighing conveyer for transporting successively articles to be weighed, a weighing device located in the midway of said conveyer for weighing successively said articles one by one to produce weight signals indicative of the weights of said articles, a correction device coupled to said weighing device for receiving said weight signals and applying a predetermined correction thereto, a judging device coupled to said correction device for receiving the corrected weight signal output of said correction device and judging which one of a plurality of predetermined ranges of weight is to be assigned to each of said corrected weight signal outputs to produce a sorting signal indicative of the assigned range of weight, and a distributing device coupled to said conveyer and judging device for sending said article which has been weighed along a predetermined path in accordance with said sorting signal, said correction device including a first change-over switch for producing alternatively a first command signal specifying static measurement and a second command signal specifying dynamic measurement, a second change-over switch for producing alternatively a third command signal specifying normal operation and a fourth command signal specifying correcting operation, a first memory responsive to said first and fourth command signals for storing said weight signal input at that time, a second memory responsive to said second and fourth command signals for storing said weight signal input at that time, an arithmetic unit coupled to said first and second memories for receiving their outputs and calculating a value of a predetermined function having said outputs as its variables, and a correction circuit responsive to said second and third command signals for receiving the outputs of said arithmetic unit and said weighing device and applying a predetermined correction based upon said value of function to said weight signals, and said weighing conveyer is provided with driving means for stopping said conveyer in response to said first command signal and starting said conveyer in response to said second command signal.

* * * * *